(12) United States Patent
Xu et al.

(10) Patent No.: US 12,486,426 B2
(45) Date of Patent: Dec. 2, 2025

(54) METHOD OF INSULATING A MOTOR

(71) Applicant: SUZHOU JUFENG ELECTRICAL INSULATION SYSTEM CO., LTD., Suzhou (CN)

(72) Inventors: Weihong Xu, Suzhou (CN); Cheng Zhou, Suzhou (CN); Yu Xia, Suzhou (CN); Guoxing Ru, Suzhou (CN); Wei Ji, Suzhou (CN); Yaoxiang Mo, Suzhou (CN); Zhitao Gu, Suzhou (CN)

(73) Assignee: SUZHOU JUFENG ELECTRICAL INSULATION SYSTEM CO., LTD., Suzhou (CN)

( * ) Notice: Subject to any disclaimer, the term of this patent is extended or adjusted under 35 U.S.C. 154(b) by 688 days.

(21) Appl. No.: 17/802,092

(22) PCT Filed: Aug. 25, 2020

(86) PCT No.: PCT/CN2020/111067
§ 371 (c)(1),
(2) Date: Aug. 24, 2022

(87) PCT Pub. No.: WO2021/237959
PCT Pub. Date: Dec. 2, 2021

(65) Prior Publication Data
US 2023/0088520 A1 Mar. 23, 2023

(30) Foreign Application Priority Data

May 26, 2020 (CN) .......................... 202010451839.2

(51) Int. Cl.
| C09D 179/08 | (2006.01) |
| C09D 5/18 | (2006.01) |
| C09D 7/61 | (2018.01) |
| C09D 7/63 | (2018.01) |
| H02K 15/10 | (2025.01) |
| H02K 15/12 | (2025.01) |

(52) U.S. Cl.
CPC .......... *C09D 179/085* (2013.01); *C09D 5/18* (2013.01); *C09D 7/61* (2018.01); *C09D 7/63* (2018.01); *H02K 15/105* (2013.01); *H02K 15/12* (2013.01)

(58) Field of Classification Search
None
See application file for complete search history.

(56) References Cited

U.S. PATENT DOCUMENTS

| 6,579,566 B1 * | 6/2003 | Moser | .................... | C08G 59/68 |
| | | | | 427/430.1 |
| 2008/0246354 A1 * | 10/2008 | Asao | ..................... | H02K 15/12 |
| | | | | 310/45 |

FOREIGN PATENT DOCUMENTS

| CN | 101227124 A | | 7/2008 | |
| CN | 101707406 A | * | 5/2010 | |
| CN | 102225986 A | | 10/2011 | |
| CN | 103540238 A | | 1/2014 | |
| CN | 108102367 A | * | 6/2018 | .......... C08G 63/918 |
| CN | 110690799 A | | 1/2020 | |
| GB | 2061130 A | * | 5/1981 | ............. B29C 35/08 |

* cited by examiner

*Primary Examiner* — Alexander M Weddle
(74) *Attorney, Agent, or Firm* — SZDC Law PC

(57) ABSTRACT

The present invention relates to a method of insulating a motor, comprising: providing a impregnating resin; heating up the motor windings with electricity to 100-120° C., and potting the motor windings with the impregnating resin for 2-5 min at that temperature; heating up the motor windings with electricity to 140-160° C., and trickling the impregnating resin for 3-8 min for insulation; heating up the motor windings with electricity to 165-175° C., and curing for 15-45 min. The method of insulating a motor provided by the present invention has a higher resin filling level and a higher resin utilization rate, as well as faster curing speed.

9 Claims, No Drawings

METHOD OF INSULATING A MOTOR

This application is the National Stage Application of PCT/CN2020/111067, filed on Aug. 25, 2020, which claims priority to Chinese Patent Application No. 202010451839.2, filed on May 26, 2020, which is incorporated by reference for all purposes as if fully set forth herein.

FIELD OF THE INVENTION

This invention relates to a method of insulating a motor.

BACKGROUND

Renewable energy electric vehicles mainly include: battery management System (BMS) drive system, vehicle management system (VMS), vehicle body. The drive system works as the heart of the electric vehicle, including the motor and the controller, in which the motor plays a decisive role in the performance of the drive system. The operation characteristics of the renewable include: frequent start-up, dealing with speed changing and climbing up requirements; large alternating load, impulsive voltage, and overload current; high power density and operating temperature; strong mechanical vibration; high reliability and security requirements. Therefore, the insulation treatment of the motor is very important, and the technical requirements for the insulating materials used such as impregnating resin are also more stringent.

In recent years, with the improvement of the power density for renewable energy electric vehicle motor, the winding wire harness should be fully coated to form an overall structure after resin curing to prepare a non-air gap insulation structure; and the resin curing waste should be significantly reduced or even eliminated to meet the environmental protection requirements.

The existing insulation impregnating technology mainly includes ordinary impregnating method, vacuum impregnating method, vacuum pressure impregnating method, continuous impregnating method, dipping method, trickling method, whereas ordinary impregnating method, vacuum impregnating method, vacuum pressure impregnating method, continuous impregnating method have a long curing time, low production efficiency, and insufficiently coating on the wires due to the large resin loss during the baking and curing time, thereby affecting the overall strength and insulation properties, additionally causing a problem of dealing with the curing resin waste. Comparing to the above-mentioned methods, through rotating work pieces during baking process, the dipping method and the trickling method have reduced resin loss and curing waste, moreover improved production efficiency, However, for the high power density motor, there is still space for improving the insulation filling level, resin utilization rate, and curing speed to meet the requirements of the renewable energy electric vehicle.

SUMMARY

It is a primary object of the present invention to provide a method of insulating motors with higher insulation filling level, resin utilization rate, and curing speed.

To achieve the above object, what provided is as follows.

A method of insulating a motor includes: providing a impregnating resin; heating up the motor windings with electricity to 100-120° C., and potting the motor winding with the impregnating resin for 2-5 min at that temperature; heating up the motor winding with electricity to 140-160° C., and trickling the impregnating resin for 3-8 min for insulation; heating up the motor winding with electricity to 165-175° C., and curing for 15-45 min.

Preferably, the potting temperature is 110-120° C., the trickling temperature is 150-155° C., and the curing temperature is 168-173° C.

Preferably, preheating the motor windings to 100-125° C. for 3-8 min before the potting process.

Preferably, the impregnating resin comprises: 20-55 wt % of polyesterimide resin; 4-20 wt % of modified epoxy resin; 3-10 wt % of curing agent; 25-45 wt % of active monomers; 10-30 wt % of inorganic filler; 0.03-0.1 wt % of polymerization inhibitor; 0.06-2.5 wt % of initiator; 0.01-2 wt % of additives.

Furthermore, the polyesterimide resin is unsaturated polyesterimide resin; preferably, the modified epoxy resin is the esterification reactant of bisphenol A epoxy resin and/or bisphenol F epoxy resin reacting with single or multiple components of acrylic acid, maleic anhydride, methyl hexahydrophthalic anhydride, tetrahydrophthalic anhydride; or/and, the modified epoxy resin is the chain extension reaction product of bisphenol A epoxy resin and/or bisphenol F epoxy resin reacting with polyhydric alcohols; preferably, the curing agent is one or multiple components of curing agent 594, tung oleic anhydride and nadic anhydride; preferably, the active monomer is one or multiple components of 1, 4-butanediol dimethacrylate, diethylene glycol dimethacrylate, dipropylene glycol dimethacrylate, 1, 6-hexadiol dimethacrylate, trimethylol propane triacrylate.

According to a preferable embodiment, the active monomer is a combination of 1, 4-butanediol dimethacrylate and one component of diethylene glycol dimethacrylate, dipropylene glycol dimethacrylate, 1,6-hexadiol dimethacrylate, trimethylol propane triacrylate with a mass ratio of 1:0.1-1.5.

Furthermore, the inorganic filler is one or multiple components of silicon dioxide, trialumina, boron nitride and mica powder, and the particle size of the inorganic filler is at micron level and/or nano level.

Preferably, the particle size of the inorganic filler is 1-10 µm.

Preferably, the inorganic filler is a combination of two or multiple components of silicon dioxide, aluminum oxide, boron nitride, and mica powder with different particle sizes.

Preferably, the polymerization inhibitor is tert-butylcatechol.

Preferably, the initiator is one or multiple components of diisopropylbenzene peroxide, 2, 2-bis (tert-butylperoxide) butane, benzoyl peroxide, and 1, 1-bis (tert-amyl peroxide) cyclohexane.

Preferably, the additive is one or multiple components of additives KH550, BYK103, deqian 904S, and cobalt naphthenate.

The chemical raw materials used in the present invention could be obtained by market purchase or prepared by means known to the field.

Except for the impregnating resin in between the windings, the whole tank of the impregnating resin would not occur gel reaction during the potting process. The impregnating resin of the present invention is more suitable for the insulation impregnation of the motor windings due to its faster curing speed, low volatility, high adhesive strength, good thermal stability, excellent insulation property and corrosion resistance, as well as enhanced thermal conductivity.

Optionally, the impregnating resin comprises: 25-40 wt % of polyesterimide resin; 4-10 wt % of modified epoxy resin; 3-6 wt % of curing agent; 30-35 wt % of active monomers; 20-25 wt % of inorganic filler; 0.03-0.1 wt % of polymerization inhibitor; 0.06-2.5 wt % of initiator; 0.01-2 wt % of additives.

According to a specific and preferred implementation, the preparation method of the impregnating resin includes the following steps:

(1) heating the polyesterimide resin to 100-110° C., adding the modified epoxy resin with evenly stirring, and then cooling to 60° C. and below, adding the active monomer, the polymerization inhibitor, and the additives, after that stirring evenly to obtain a resin mixture;
(2) adding the resin mixture obtained in step (1) to the kettle mixer, setting the stirring speed at 1000~2000 r/min for homogeneous emulsification, and adding the inorganic filler to the kettle mixer to stir and disperse, then changing speed to 6000-13000 r/min to stir and emulsify for 2-3 h with the temperature controlled below 60° C.;
(3) after homogeneous emulsifying reducing the stirring speed to 500-1000 r/min, cooling down to the temperature below 45° C., adding the curing agent and the initiator to stir and disperse for 1-2 h to obtain the impregnating resin.

Optionally, the gel time of the impregnating resin at 100±2° C. is less than 30 min; after 96 h storage at 50° C., the viscosity increase factor at 23±1° C. is less than 0.2 times. Optionally, the motor winding is a stator winding of a renewable energy electric vehicle motor.

Optionally, the utilization rate of the impregnating resin is greater than 90%.

Comparing to the conventional impregnation technology with approximately 70% of resin utilization rate, the aforesaid method could reach 100% of the resin utilization rate to eliminate the resin waste, and meanwhile increase the production efficiency to 3-5 times; moreover, the aforesaid method could accomplish a smooth continuous coating with a higher resin filling level up to 3-5 times greater than that of the conventional technology; additionally, the aforesaid method could prepare no-air gap insulating layers to improve the adhesive strength of the motor windings, reduce the partial discharge and enhance the heat dissipation; in addition, the impregnating resin prepared by the aforesaid method has an increased curing speed up to 3 times greater than that of the conventional technology, an excellent stability to meet the requirements of the electric-heating curing process, an enhanced thermal conductivity with a heat conductivity coefficient greater than 0.5 W/(m·K) (whereas the heat conductivity coefficient of conventional commercial impregnating resin is about 0.2 W/(m·K)), an advantage of non-toxic and environment-friendly property with curing volatiles ≤1%.

Due to the application of the above technical scheme, the present invention has the following advantages superior to the prior art: disclosed is a new method of insulating a motor with higher resin filling level, more efficient resin utilization rate and enhanced curing speed.

DETAILED DESCRIPTION

The present invention will be further described below in conjunction with the embodiments shown in the accompanying drawings, but the present invention is not limited to the following embodiments The sources of raw materials in the following embodiments and comparative examples are as follows.

The polyesterimide resin is JF-956 polyesterimide resin purchased from Suzhou Jufeng Electrical Insulation System Co Ltd. The preparation method of tung oleic anhydride is as follows: adding 80 kg tung oil to the reaction kettle to stirring and heat to 100° C.; then vacuumizing for 0.5 h; after cooling to 80° C. adding 20 kg maleic anhydride; and then heating to 150-160° C., keeping at 150-160° C. to react for 2 h; after that cooling down to a temperature below 80° C. to discharge and obtain the tung oleic anhydride resin.

The preparation method of acrylic modified epoxy ester is as follows: adding 623 kg of KG128 epoxy resin to the reaction kettle with heating and stirring, and vacuumizing for 0.5 h at 125±5° C. (vacuum pressure value is above 0.088 MPa); releasing the vacuum, and adding 58 kg of acrylic acid, 0.21 kg of chromium acetyl acetonate, 0.19 kg of hydroquinone to the reaction kettle; and then heating up to 135-140° C., keeping at 135-140° C. to react for 0.5 h; sampling to test the acid value, when the acid value is less than 3 KOHmg/g, cooling down to a temperature below 125° C. and adding 22 kg of aluminum acetyl acetonate to the reaction kettle; after that turning on the vacuum pump, keeping pumping for 10-15 min at 115-120° C. under the vacuum pressure above 0.088 Mpa; after all the reactants are melting; cooling down to a temperature below 60° C. to discharge and obtain the acrylic modified epoxy ester.

The preparation method of acrylic acid-maleic anhydride modified epoxy ester is as follows: adding 500 kg of 128 epoxy resin into the reaction kettle to heat up and stir; vacuumizing for 0.5 h at 130±5° C. (vacuum pressure value is above 0.088 MPa); releasing the vacuum, and adding 38 kg of acrylic acid, 0.09 kg of N, N-dimethylbenzylamine, 0.11 kg of hydroquinone, and then heating up to 135-140° C. to keep warm for 0.5 h; after that sampling to test the acid value, when the acid value is below 3 KOHmg/g, cooling down to 135° C. to add 23 kg of maleic anhydride; after reacting at 125-130° C. for 20 min, sampling to test the acid value, when the acid value is below 20 KOHmg/g, vacuumizing for 20 min under the vacuum pressure of 0.088 MPa, and then sampling to detect the acid value, when the acid value is below 10 KOHmg/g, ending the reaction; cooling down to 125° C. and adding 15 kg of aluminum acetyl acetonate, then turning on the vacuum pump to vacuumizing for 10-15 min at 115-120° C. under the vacuum pressure above 0.088 MPa; after all the reactants are melting, cooling down to 60° C. to discharge and obtain acrylic acid-maleic anhydride modified epoxy resin.

Embodiment 1

The present embodiment took the motor stator of a renewable energy electric vehicle with a center height of 132 mm as an example. The steps of insulation treatment are as follows:
(1) lifting the stator with a lifting device, connecting the windings to electricity, preheating to 120° C. and keep warm for 5 min; (2) heating up the winding to 120° C., and potting the stator (motor winding) with the impregnating resin for 3 min at 120° C.; (3) heating up the winding to 150° C., and trickling the impregnating resin for 5 min for insulation; (4) heating up the winding to 170° C., and curing for 20 min; (5) after disassembling the stator and cooling naturally, the stator was impregnated and insulated.

The aforesaid impregnating resin was prepared as follows:
(1) mixing 358 kg of 105° C. polyesterimide resin with 60 kg of acrylic modified epoxy ester, and stirring for 15 min, then cooling down to 60° C., and then adding 320 kg of 1, 4-butanediol dimethacrylate and 0.6 kg of tert-butylcatechol, and 10 kg of additive KH550 to stir 30 min to obtain a resin mixture;
(2) adding the resin mixture into a kettle mixer, setting the stirring speed at 1500 r/min to stir the mixture, and gradually adding 100 kg of 3000-mesh spherical aluminum oxide and 100 kg of 8000-mesh silicon dioxide to stir and disperse; after that changing the stirring speed to 6500 r/min to homogeneously emulsifying and dispersing for 2.5 h, meanwhile cooling the inner wall of the kettle mixer with cooling water to control the temperature of the resin mixture below 60° C.;
(3) after homogeneously emulsifying and dispersing, reducing the stirring speed to 800 r/min, and cooling down to a temperature below 45° C. through cooling water, and then adding 30 kg of curing agent 594, 13 kg of dicumyl peroxide, 3 kg of 2, 2-bis(tert-butylperoxide) butane, 0.9 kg of 8% cobalt naphthenate solution to stir and disperse for 2 h, after filtering by a 1000-mesh filter screen and packaging to obtain the impregnating resin.

Embodiment 2

The present embodiment took the motor stator of a renewable energy electric vehicle with a center height of 132 mm as an example. The steps of insulation treatment are as follows:
(1) lifting the stator with a lifting device, connecting the windings to electricity, preheating to 115° C. and keep warm for 6 min; (2) heating up the winding to 115° C., and potting the stator with the impregnating resin for 4 min at 115° C.; (3) heating up the winding to 150° C., and trickling the impregnating resin for 5 min for insulation; (4) heating up the winding to 168° C., and curing for 23 min; (5) after disassembling the stator and cooling naturally, the stator was impregnated and insulated.

The aforesaid impregnating resin was prepared as follows:
(1) mixing 380 kg of 110° C. polyesterimide resin with 50 kg of acrylic acid-maleic anhydride modified epoxy resin and stirring for 20 min, then cooling down to 59° C., and then adding 280 kg of 1,4-butanediol dimethacrylate and 40 kg of diethylene glycol dimethacrylate, 0.8 kg of tert-butylcatechol, and 12 kg of BYK103 to stir 35 min to obtain a resin mixture;
(2) adding the resin mixture into a kettle mixer, setting the stirring speed at 1350 r/min to stir the mixture, and gradually adding 200 kg of 8000-mesh aluminium oxide and 20 kg of 5000-mesh boron nitride to stir and disperse; after that changing the stirring speed to 8500 r/min to homogeneously emulsifying and dispersing for 3 h, meanwhile cooling the inner wall of the kettle mixer with cooling water to control the temperature of the resin mixture below 60° C.;
(3) after homogeneously emulsifying and dispersing, reducing the stirring speed to 600 r/min, and cooling down to a temperature below 45° C. through cooling water, and then adding 50 kg of tung oil anhydride, 10 kg of dicumyl peroxide, 3 kg of benzoyl peroxide, 0.8 kg of 8% cobalt naphthenate solution to stir and disperse for 2 h, after filtering by a 1000-mesh filter screen and packaging to obtain the impregnating resin.

Embodiment 3

The present embodiment took the motor stator of a renewable energy electric vehicle with a center height of 132 mm as an example. The steps of insulation treatment are as follows:
(1) lifting the stator with a lifting device, connecting the winding to electricity, preheating to 118° C. and keep warm for 6 min; (2) heating up the winding to 110° C., and potting the stator with the impregnating resin for 4 min at 110° C.; (3) heating up the winding to 155° C., and trickling the impregnating resin for 4 min for insulation; (4) heating up the winding to 173° C., and curing for 28 min; (5) after disassembling the stator and cooling naturally, the stator was impregnated and insulated.

The aforesaid impregnating resin was prepared as follows:
(1) mixing 300 kg of 100° C. polyesterimide resin with 80 kg of acrylic modified epoxy resin and stirring for 20 min, then cooling down to 60° C., and then adding 150 kg of 1, 4-butanediol dimethacrylate and 180 kg of diethylene glycol dimethacrylate, 0.6 kg of tert-butylcatechol, and 13 kg of disponer 904S to stir 30 min to obtain a resin mixture;
(2) adding the resin mixture into a kettle mixer, setting the stirring speed at 1580 r/min to stir the mixture, and gradually adding 155 kg of 6000-mesh aluminium oxide and 80 kg of 5000-mesh Mica powder to stir and disperse; after that changing the stirring speed to 8000 r/min to homogeneously emulsifying and dispersing for 2 h, meanwhile cooling the inner wall of the kettle mixer with cooling water to control the temperature of the resin mixture below 60° C.;
(3) after homogeneously emulsifying and dispersing, reducing the stirring speed to 750 r/min, and cooling down to a temperature below 45° C. through cooling water, and then adding 10 kg of curing agent 594, 50 kg of tung oil anhydride, 13 kg of 1, 1-bis (tertiary amyl peroxy) cyclohexane, 1.1 kg of 8% cobalt naphthenate solution to stir and disperse for 2.5 h, after filtering by a 1000-mesh filter screen and packaging to obtain the impregnating resin.

Comparative Example 1

Comparative example 1 provided a vacuum pressure impregnating technology applied on the motor stator of a renewable energy electric vehicle with a center height of 132 mm, and the vacuum pressure impregnating technology comprises:
(1) preheating the stator in a 100° C. oven for 30 min, and then cooling down until the stator core was below 50° C.; (2) lifting the stator into a impregnation tank for impregnation, vacuumizing to 5000 Pa, and maintaining 5000 Pa for 20 min; (3) transferring the impregnating resin from a paint storage tank to the impregnation tank to ensure the impregnating resin rise to 10 cm over the top of the stator, after that impregnating for 10 min, then vacuumizing to 0.3 MPa and maintaining 0.3 MPa for 20 min; (4) releasing the vacuum to the atmosphere pressure, and then lifting the stator from the impregnation tank to trickle for 25 min; (5) transferring the stator to the 150° C. oven to cure for 5 h; (6) turning off the oven and cooling naturally to obtain the insulated stator.

The aforesaid impregnating resin was prepared as follows:
mixing 480 kg of 110° C. polyesterimide resin with 100 kg of acrylic modified epoxy resin and stirring for 20 min, then cooling down to 60° C., and then adding 403 kg of 1, 4-butanediol dimethacrylate to evenly stir, after cooling to a temperature below 45° C., adding 15 kg of diisopropylbenzene peroxide, 1 kg of 8% cobalt naphthenate solution, and 0.6 kg of tert-butylcatechol to stir for 35 min, after filtering by a 1000-mesh filter screen and packaging, obtaining a low-volatility polyesterimide impregnating resin.

Comparative Example 2

Comparative example 2 provided a vacuum pressure impregnating technology applied on the motor stator of a renewable energy electric vehicle with a center height of 132 mm. The process for the vacuum pressure impregnating technology of comparative example 2 was the same with that of the comparative example 1, whereas the preparation method for the impregnating resin was different, which comprised:
mixing 520 kg of 106° C. polyesterimide resin with 80 kg of acrylic acid-maleic anhydride modified epoxy resin, stirring for 20 min, and cooling down to 60° C., and then adding 382 kg of styrene to stir evenly, after cooling down to a temperature below 45° C., adding 13 kg of diisopropylbenzene peroxide, 1 kg of 8% cobalt naphthenate solution, 0.5 kg of tert-butylcatechol, stirring for 35 min until uniform, after filtering by a 1000-mesh filter screen and packaging, obtaining the polyesterimide impregnating resin.

The performances of the impregnated stators of Embodiments 1 to 3 and Comparative Examples 1 to 2 were tested, and the results are shown in Table 1:

TABLE 1

Performance Comparison of the Impregnated Stator

| Performance indicator | Measurement Unit | Embodiment 1 | Embodiment 2 | Embodiment 3 | Comparative Example 1 | Comparative Example 2 |
|---|---|---|---|---|---|---|
| Impregnating Resin Filling Weight | g | 531 | 510 | 556 | 136 | 130 |
| Resin Utilization Rate | % | 98.65 | 98.36 | 98.96 | 68.65 | 65.82 |
| Ground PDIV (Power Frequency Voltage) | kV | 1.29 | 1.28 | 1.32 | 1.16 | 1.09 |
| Corona-Resistance life | h:min | 332:26 | 316:53 | 329:18 | 228:35 | 183:29 |

The test method for impregnating resin filling weight is: weighing the stator before insulation and noting for $m_1$, weighing the stator after insulation and noting for $m_2$, the value of $m_2-m_1$ is the impregnating resin filling weight. The impregnating resin filling weight indicates the impregnating resin filling level, the more the impregnating resin filling weight, the higher the impregnating resin filling level is.

The test method for impregnating resin utilization rate is: the weight of the impregnating resin after insulation (the impregnating resin filling weight)/the weight of the impregnating resin before insulation×100%.

The test method for PDIV is: measuring the three phase-to-earth partial discharge inception voltage for the stator on the MPD 600 partial discharge analysis system under 50 Hz.

The corona-resistance life of the impregnated stator was tested on the corona-resistance life analysis device for insulation structure under the conditions that: 3000v of voltage, 10 kHz of frequency, 200 ns of pulse time, and 180° C. of temperature.

The performances of the impregnating resins of Embodiments 1 to 3 and Comparative Examples 1 to 2 were tested, and the results are shown in Table 2:

TABLE 2

Performance Comparison of the Impregnating Resin

| Performance Indicator | Measurement Unit | Embodiment 1 | Embodiment 2 | Embodiment 3 | Comparative Example 1 | Comparative Example 2 |
|---|---|---|---|---|---|---|
| Viscosity (25 ± 2° C.) | mPa · s | 2180 | 2350 | 2230 | 2280 | 2130 |
| Curing Volatile (150 ± 2° C., 2 h) | % | 0.75 | 0.69 | 0.70 | 1.13 | 10.56 |
| Gel Time100 ± 2° C. | min: s | 13:52 | 15:35 | 13:26 | 35:53 | 46:23 |
| Adhesive Strength (Normality, Helical Coil method) | N | 226 | 239 | 256 | 186 | 156 |
| Breakdown Voltage (Normality) | kV/mm | 26.35 | 27.26 | 25.51 | 24.19 | 23.35 |
| Electrical resistivity (Normality) | Ω · m | $6.5 \times 10^{14}$ | $7.35 \times 10^{14}$ | $5.32 \times 10^{14}$ | $3.16 \times 10^{14}$ | $3.35 \times 10^{14}$ |
| Storage Stability (50° C., 96 h) | fold | 0.12 | 0.15 | 0.16 | 0.23 | 0.39 |
| Thermal Conductivity (Normality) | W/(m · K) | 0.52 | 0.55 | 0.61 | 0.19 | 0.20 |

Insulating resin performance tests were referring to GB/T 15022.2-2017 resin-based active compounds for electrical insulation—Part 2, in which viscosity was tested according to GB/T 24148.4, storage stability was basically tested according to GB/T 15022.2-2017, only storage temperature is changed to 50° C.

The foregoing description has been made on several embodiments of this invention which are relatively specific and detailed, however the invention is not limited thereto. It should be further understood by those skilled in the art that various changes and modifications may be made without departing from the spirit of the invention are protected by this invention. Therefore, the scope of protection for this invention shall be subject to the appended claims.

What is claimed is:

1. A method of insulating a motor, comprising:
providing a impregnating resin;
heating up a motor winding with electricity to 100-120° C., and potting the motor winding with the impregnating resin for 2-5 min at that temperature;
heating up the motor winding with electricity to 140-160° C. and trickling the impregnating resin for 3-8 min for insulation;
heating up the motor winding with electricity to 165-175° C., and curing for 15-45 min, wherein a preparation method of the impregnating resin comprising a recited series of steps:
(1) heating a polyesterimide resin to 100-110° C., adding a modified epoxy resin with evenly stirring, and then cooling to 60° C. and below, adding an active monomer, a polymerization inhibitor, additives, after that stirring evenly to obtain a resin mixture;
(2) adding the resin mixture obtained in step (1) to a kettle mixer, setting a stirring speed at 1000~2000 r/min for homogeneous emulsification, and adding an inorganic filler to the kettle mixer to stir and disperse, then changing speed to 6000-13000 r/min to stir and emulsify for 2-3 h with the temperature controlled below 60° C.;
(3) after homogeneous emulsifying reducing the stirring speed to 500-1000 r/min, cooling down to a temperature below 45° C., adding a curing agent and an initiator to stir and disperse for 1-2 h to obtain the impregnating resin.

2. A method of insulating a motor according to claim 1, wherein the potting temperature is 110-120° C., the trickling temperature is 150-155° C., and the curing temperature is 168-173° C.

3. A method of insulating a motor according to claim 1, wherein preheating the motor winding to 100-125° C. for 3-8 min before the potting process.

4. A method of insulating a motor according to claim 1, wherein the impregnating resin comprises: 20-55 wt % of polyesterimide resin; 4-20 wt % of modified epoxy resin; 3-10 wt % of curing agent; 25-45 wt % of active monomers; 10-30 wt % of inorganic filler; 0.03-0.1 wt % of polymerization inhibitor; 0.06-2.5 wt % of initiator; 0.01-2 wt % of additives.

5. A method of insulating a motor according to claim 4, wherein polyesterimide resin is unsaturated polyesterimide resin;
the modified epoxy resin is the esterification reactant of bisphenol A epoxy resin and/or bisphenol F epoxy resin reacting with single or multiple components of acrylic acid, maleic anhydride, methyl hexahydrophthalic anhydride, tetrahydrophthalic anhydride;
or/and, the modified epoxy resin is the chain extension reaction product of bisphenol A epoxy resin and/or bisphenol F epoxy resin reacting with polyhydric alcohols;
the curing agent is one or multiple components of curing agent 594, tung oleic anhydride and nadic anhydride;
the chemical component of curing agent 594 is β, β'-dimethylaminoethoxy-1, 3, 6, 2-trioxoboraba-octacyclic, and the chemical category is boronane tertiary amine curing agent;
the active monomer is one or multiple components of 1, 4-butanediol dimethacrylate, diethylene glycol dimethacrylate, dipropylene glycol dimethacrylate, 1,6-hexadiol dimethacrylate, trimethylol propane triacrylate;
the inorganic filler is one or multiple components of silicon dioxide, aluminum oxide, boron nitride and mica powder, and the particle size of the inorganic filler is at micron level and/or nano level;
the polymerization inhibitor is tert-butylcatechol;
the initiator is one or multiple components of diisopropylbenzene peroxide, 2,2-bis(tert-butylperoxide) butane, benzoyl peroxide, and 1, 1-bis (tert-amyl peroxide) cyclohexane;
the additive is one or multiple components of additives KH550, BYK103, Deqian 904S, and cobalt naphthenate; and
the CAS number of additives KH550 is 919-30-2, and the chemical component is γ-aminopropyltriethoxysilane, and the chemical category is silane coupling agent; the chemical component of BYK103 is a polyester phosphate salt solution; the chemical component of Deqian 904S is mixture of polymeric carboxylic acid and modified aldehyde-functional siloxane.

6. A method of insulating a motor according to claim 4, wherein the impregnating resin comprises:
25-40 wt % of polyesterimide resin; 4-10 wt % of modified epoxy resin; 3-6 wt % of curing agent; 30-35 wt % of active monomers; 20-25 wt % of inorganic filler; 0.03-0.1 wt % of polymerization inhibitor; 0.06-2.5 wt % of initiator; 0.01-2 wt % of additives.

7. A method of insulating a motor according to claim 4, wherein the gel time of the impregnating resin at 100±2° C. is less than 30 min; after 96 h storage at 50° C., the viscosity of the impregnated resin increased by 0.2 times compared to the original viscosity.

8. A method of insulating a motor according to claim 1, wherein the motor winding is a stator winding for a motor of an electric vehicle.

9. A method of insulating a motor according to claim 1, wherein the motor winding is coated with 90% of coating material supplied.

* * * * *